United States Patent

Guy, Sr.

[15] 3,648,347

[45] Mar. 14, 1972

[54] DISK PACK CLEANING TABLE

[72] Inventor: Joseph T. Guy, Sr., 80 Henry Clay Road, Newport News, Va. 23601

[22] Filed: Mar. 23, 1970

[21] Appl. No.: 21,732

[52] U.S. Cl. ..........................29/200 D, 29/203 R, 29/208 B, 29/208 E

[51] Int. Cl. ....................................B23p 19/00, B23p 19/04

[58] Field of Search .................29/208 E, 208 B, 200 D, 240, 29/211, 203 R

[56] References Cited

UNITED STATES PATENTS 3,289,282 12/1966 Shaffer................................29/200 D 3,328,873 7/1967 Schweers..............................29/208 E

*Primary Examiner*—Thomas H. Eager

*Attorney*—Howard J. Osborn and John R. Manning

[57] ABSTRACT

A mount for removing the plastic dust cover from a digital computer disk pack for inspection and cleaning wherein the disk pack is placed on a rotatable spindle and an ejector within the spindle engages the dust cover release to remove the cover allowing access for cleaning.

6 Claims, 3 Drawing Figures

INVENTOR.
JOSEPH T. GUY, SR.
BY Howard J. Osborn
ATTORNEY

INVENTOR.
JOSEPH T. GUY, SR.
BY Howard J. Osborn
ATTORNEY

DISK PACK CLEANING TABLE

ORIGIN OF THE DISCLOSURE

The invention herein described was made by an employee of the National Aeronautics and Space Administration and may be manufactured or used by or for the Government for governmental purposes without the payment of any royalties thereon or therefor.

BACKGROUND OF THE INVENTION

This invention relates to a rotatable mount for cleaning and inspecting electronic computer disk packs. More particularly, this invention relates to a mount for cleaning and inspecting computer disk packs incorporating means to remove the dust cover which normally protects the pack when it is not in use.

The disks comprising the pack must be cleaned periodically as one would clean a stack of phonograph records, to remove scuff marks, lint, and carbon. This operation is usually accomplished with a thin plastic paddle wrapped with a nonlinting fabric and dipped in a volatile cleaning solution. Before cleaning, however, the protective cover must be removed from the pack. The only prior art method of removing the cover was by the action of inserting the disk pack into the computer. A cover release is built into the computer as part of the disk pack drive system.

Prior to the use of this novel mount, the disk packs had to be cleaned while installed in the computer. Such a practice was quite expensive since the computer could not be operated during such cleaning operations. Moreover, cleaning work space was cramped and lighting conditions were usually poor. Often, marks on the disks which impair computer operation went unnoticed during inspection due to bad lighting and limited viewing angle. In view of the high costs of computer operation and the importance of a thorough, periodic cleaning and inspecting of the disks, there is a definite need in the art for a device which will permit such cleaning without mounting the disk packs on the computer.

Therefore, it is an object of the present invention to provide a novel means of removal of the dust covers from electronic computer disk packs or the like without mounting the pack on the computer.

Another object of the present invention is a novel mount for the cleaning and inspecting of disk packs or the like.

SUMMARY OF THE INVENTION

In accordance with one aspect of the invention, the foregoing objects are attained by providing a circular support structure to contain a rotatable spindle, centrally disposed upon the support structure and shaped to receive the disk pack. After the disk pack with its protective dust cover is placed snugly upon the hollow spindle, a specially shaped ejector retractably housed in the spindle is moved to contact the release mechanism of the dust cover, freeing this cover from the pack. Ejector movement may be facilitated by a lever mounted beneath the support structure. One end of this lever contacts the base of the ejector, the other end projects beyond the support structure, and at an intermediate location, the lever is supported and pivoted. Depressing the free end of the lever moves the ejector to contact the dust cover release mechanism. The lever may be spring-biased to allow ejector retraction when the lever is released. Legs beneath the support structure space the support structure from the work bench or other surface and allow lever operation. Spindle rotation greatly aids the cleaning and inspecting of the disk packs.

BRIEF DESCRIPTION OF THE DRAWINGS

A more complete appreciation of the invention and many of the attendant advantages thereof will be more clearly understood by reference to the following detailed description in connection with the drawings wherein.

DESCRIPTION OF THE PREFERRED EMBODIMENT

Figure 1:
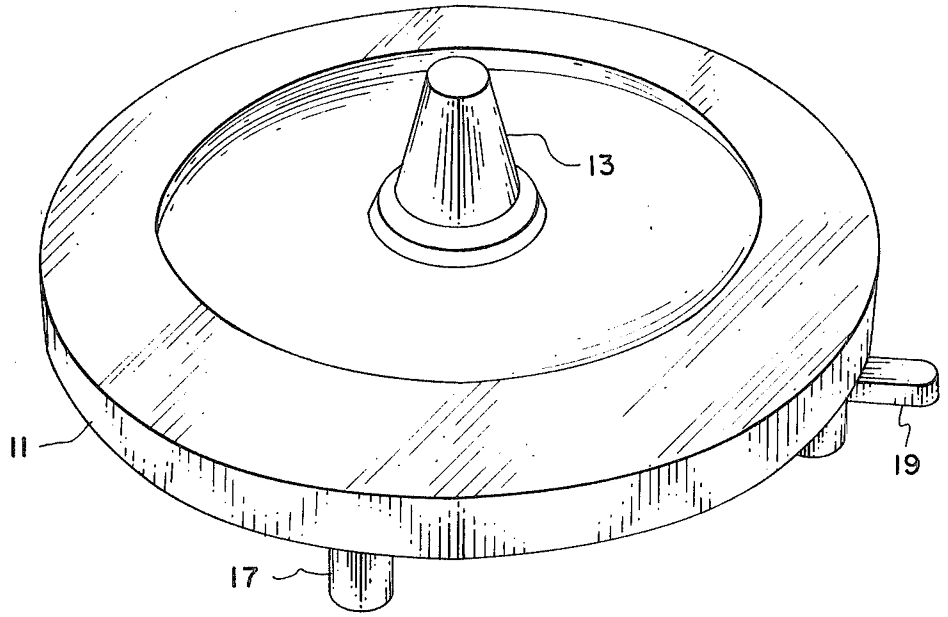
FIG. 1 is a perspective view of the mount in accordance with the present invention.

Referring now to the drawings wherein like reference numerals designate identical or corresponding parts throughout the several views and more particularly to FIG. 1, the mount is shown in perspective. The support structure 11 is shown here as a circular member of approximately the same diameter as the disk packs. The tapered spindle 13 is centrally disposed in relation to the circular support structure and shaped to fit within the central cavity of a standard disk pack used on electronic computers.

Figure 2:
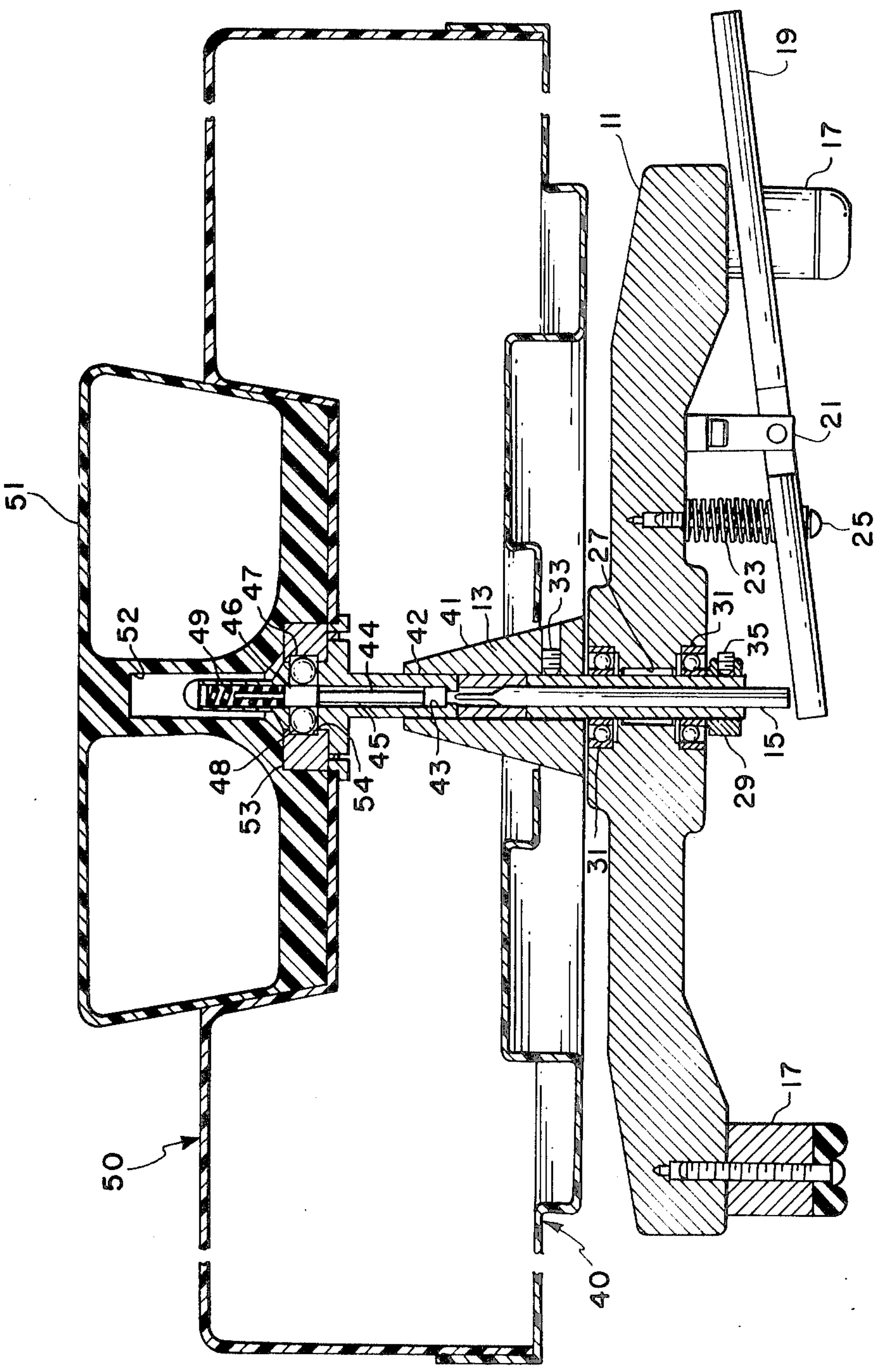
FIG. 2 is a side elevational view, partly in section, showing all principal parts and the disk pack and attached dust cover positioned for removal of the dust cover.

Referring now to FIG. 2, the structure of the invention is more readily apparent. The circular support structure 11 is drilled at its center to receive a plurality of bearing assemblies 31 and a hollow shaft 27. The bearings 31 are so disposed as to rotatably support the shaft 27 vertically in relation to the plane of support structure 11. The surface of support structure 11 which will be adjacent to the disk pack when installed is defined as the top or upper surface. A tapered hollow spindle 13 is attached to shaft 27 by a set screw 33 above support structure 11. A hollow retainer 29 is fastened to shaft 27 by a set screw 35 beneath the support structure, limiting the vertical travel of shaft 27 while allowing rotation of the spindle, shaft, retainer assembly. An ejector 15 moves freely within the hollow shaft 27 and spindle 13. The rounded upper tip of ejector 15 must be sized and shaped properly for use in tripping the dust cover release. Ejector 15 is supported at its base by lever 19. Lever 19 is intermediately pivoted about holder 21 which is attached to the bottom of support structure 11. A bolt 25 passing through a slightly oversize hole in lever 19 is fastened to the bottom of support structure 11 between ejector 15 and holder 21. A spring 23 is held in place between support structure 11 and lever 19 by bolt 25 and serves to bias lever 19 against the mechanical stop formed by the head of bolt 25. A plurality of legs 17 space support member 11 from the work bench or other surface thus providing a space for the installation and operation of lever 19.

To enhance understanding the inner action between the mount and the disk pack, FIG. 2 shows a disk pack 40 with dust cover 50 in place positioned on the mount. The disk pack 40 has a conelike hub 41 which supports the disks and release mechanism 42. The release mechanism 42 includes a T-shaped housing having a central aperture 43. A plunger 44 having a reduced area 45 and enlarged area 46 is slidable in the aperture 43. The housing also has an annular recess 47 which receives a plurality of ball detents 48. A compression spring 49 is located between the top of the plunger 44 and the upper extremity of the central aperture 43. The spring 49 normally urges the plunger to a position such that the enlarged area 46 thereof is in contact with the ball detents.

The dust cover 50 has a handle 51 that is hollow at 52 to receive the disk pack release mechanism. A collar 53 is secured in the hollow handle by means of an adhesive or other technique, and has a relief 54 which receives the ball detents 48 to hold the dust cover on the disk pack. Depressing the free end of lever 19, visibly protruding from beneath support structure 11 will release dust cover 50.

Figure 3:
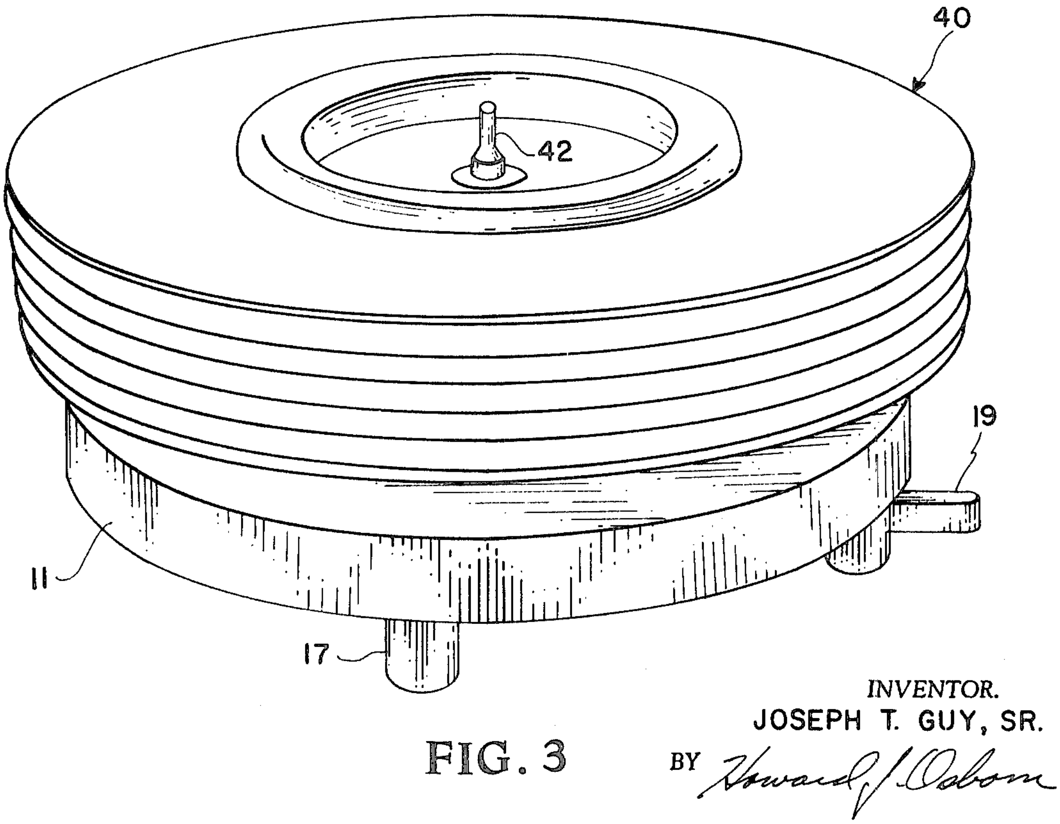
FIG. 3 is a perspective view of the mount with a disk pack placed thereon, the pack dust cover having been removed for cleaning and inspection.

FIG. 3 shows the disk pack 40 with dust cover 50 removed and ready for cleaning.

OPERATION

From the foregoing description of the invention, operation is believed apparent. However, for purposes of clarity, operation will be explained in detail with reference to FIG. 2. As shown in FIG. 2, the disk pack 40 is normally protected by a dust cover 50 when the pack is not in use on the computer. The pack with attached dust cover is installed upon the mount so that the tapered hub of the disk pack mates snugly with the tapered spindle 13 (FIG. 2). To initiate release of the dust cover, the free end of lever 19 protruding from beneath support structure 11 is depressed. This motion compresses spring 23 and moves ejector 15 into contact with the bottom of plunger 44. Continued pressure on lever 19 causes ejector 15 to move plunger 44 up against the tension of spring 49. The reduced area 45 of plunger 44 now registers with the ball detents 48 and allows them to withdraw from the relief 54 in collar 53 enabling removal of the dust cover by merely lifting on the handle 51. When dust cover 50 is removed, lever 19 is released. Spring 23 moves lever 19 against the mechanical stop formed by the head of bolt 25. Ejector 15 moves to remain in contact with the supporting surface of lever 19.

Now the disk pack 40 may be cleaned and inspected (see FIG. 3). Cleaning and inspecting are performed more efficiently as a result of the rotatable nature of spindle 13. To remove the disk pack from the mount the dust cover is placed upon the disk pack and pressed downward until the ball detents engage the relief 54 in collar 53 securing the dust cover to the disk pack. Since there is no pressure on the ejector 15, the spring 49 will move the plunger so that the enlarged area 46 abuts the ball detents locking the dust cover on the disk pack. The disk pack need not be handled during cover removal and replacement.

This invention as described may be used with disk packs from a variety of computer brands since such disk packs are generally interchangeable. However, it is intended that any (computer memory) storage package now in use or contemplated for future use and using a similar protective cover could be opened for inspecting and cleaning or other purposes with only slight modifications as to spindle and ejector design. Although only one embodiment of the invention is shown, it is to be understood that the teaching of the invention encompasses other modifications and variations. For example, the support structure is shown to be horizontally disposed so as to be parallel to a worktable, but as on the computer, the support may be vertically disposed (wall-mounted) if means are provided to restrain the disk pack after the dust cover is removed. Shapes of many components such as the support structure are not critical to operation of the invention.

What is claimed as new and desired to be secured by Letters Patent of the United States is:

1. Apparatus for use in removing the dust cover to facilitate inspection and cleaning of disk packs, or the like comprising:
a support member;
a rotatable spindle supported by said support member;

said spindle being designed to receive a disk pack or the like having a dust cover and a dust cover release mechanism thereon for rotative movement with said spindle;
ejector means carried by said spindle, said ejector means for releasing said dust cover release mechanism carried by said dust cover permitting said dust cover to be separated from said disk pack;
means for supporting and for selectively moving said ejector means between a first position remote from said dust cover release mechanism and a second position contacting said dust cover release mechanism.

2. Apparatus as in claim 1 wherein the means for supporting and selectively moving said ejector means is a lever pivotally attached to said support member.

3. Apparatus as in claim 2 including mechanical stop means attached to the support member for fixing one position of said lever, said lever in such position supporting the ejector means in the first position.

4. Apparatus as in claim 3 including a spring by which said lever is spring-biased against the mechanical stop means.

5. Apparatus as in claim 1 wherein the support member is provided with a plurality of depending members serving legs to permit operative positioning of said support member on substantially any surface parallel with said support member.

6. Apparatus for use in removing the dust cover to facilitate inspection and cleaning of disk packs, or the like, comprising:
a support member,
a rotatable spindle journaled in said support member,
said spindle being shaped to receive a disk pack thereon for rotative movement with said spindle,
ejector means carried within said spindle, said ejector means serving to contact and remove a dust cover carried by said disk pack;
lever means pivotally attached to said support member and engaging the ejector means to move the said ejector means between a first position remote from the dust cover of a disk pack installed on said spindle and a second position in contact with said dust cover;
mechanical stop means attached to the support member so as to support said lever means in such a position that the ejector means assumes the first position;
spring means to bias the lever means against the mechanical stop means;
a plurality of depending members serving as legs attached to the support member to permit operative positioning of said support member on substantially any surface parallel with said support member.

* * * * *